US011906993B2

(12) United States Patent
Melanson et al.

(10) Patent No.: US 11,906,993 B2
(45) Date of Patent: Feb. 20, 2024

(54) NONLINEAR FEEDFORWARD CORRECTION IN A MULTILEVEL OUTPUT SYSTEM

(71) Applicant: Cirrus Logic International Semiconductor Ltd., Edinburgh (GB)

(72) Inventors: John L. Melanson, Austin, TX (US); Thomas H. Hoff, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 0 days.

(21) Appl. No.: 17/960,335

(22) Filed: Oct. 5, 2022

(65) Prior Publication Data

US 2023/0139467 A1 May 4, 2023

Related U.S. Application Data

(60) Provisional application No. 63/275,142, filed on Nov. 3, 2021.

(51) Int. Cl.
*G05F 1/46* (2006.01)

(52) U.S. Cl.
CPC .................................... *G05F 1/46* (2013.01)

(58) Field of Classification Search
None
See application file for complete search history.

(56) References Cited

U.S. PATENT DOCUMENTS 6,924,700 B2 * 8/2005 Taura ...................... H03F 3/217 330/10
9,812,951 B2 * 11/2017 Sonnaillon .......... H02M 1/4208
9,887,672 B1 2/2018 Kuo et al.
10,038,378 B2 * 7/2018 Price ......................... G05F 1/56
10,181,791 B2 * 1/2019 Kesarwani ............. G05B 11/42
11,036,246 B1 * 6/2021 Kavousian ................ G05F 1/59
11,050,433 B1 * 6/2021 Melanson ................ H04R 3/00
2014/0125306 A1 * 5/2014 Babazadeh ........... H02M 3/156 323/285
2022/0376618 A1 11/2022 Cheng et al.

FOREIGN PATENT DOCUMENTS

EP 2221964 A1 8/2010
EP 2897296 A1 7/2015
EP 3416285 A1 12/2018

OTHER PUBLICATIONS

International Search Report and Written Opinion of the International Searching Authority, International Application No. PCT/US2022/047106, dated Feb. 3, 2023.

* cited by examiner

*Primary Examiner* — Thomas J. Hiltunen
(74) *Attorney, Agent, or Firm* — Jackson Walker L.L.P

(57) ABSTRACT

A feedforward correction block for use in a multi-level output system may include circuitry configured to determine an occurrence of a mode transition between operating modes of the multi-level output system, capture a loop filter output of a signal path of the multi-level output system occurring before and after the occurrence of the mode transition, and based on the transition and a change in the loop filter output responsive to the transition, determine a transition-specific compensation function to apply to a feedforward input signal of the signal path that is combined with the loop filter output.

9 Claims, 3 Drawing Sheets

NONLINEAR FEEDFORWARD CORRECTION IN A MULTILEVEL OUTPUT SYSTEM

RELATED APPLICATION

This disclosure claims priority to U.S. Provisional Patent Application No. 63/275,142, filed Nov. 3, 2021, which is incorporated by reference herein in its entirety.

FIELD OF DISCLOSURE

The field of representative embodiments of this disclosure relates to methods, apparatus and/or implementations concerning or relating to multilevel driver circuits as may be used to drive a transducer, and in particular to nonlinear feedforward correction in such multilevel driver circuits.

BACKGROUND

Many electronic devices include transducer driver circuitry for driving a transducer with a suitable driving signal, for instance for driving an audio output transducer of the host device or a connected accessory, with an audio driving signal.

In some applications, the driver circuitry may include a switching amplifier stage, e.g., a class-D amplifier output stage or the like, for generating the drive signal. Switching amplifier stages can be relatively power efficient and thus can be advantageously used in some applications. A switching amplifier stage generally operates to switch an output node between defined high-side and low-side switching voltages, with a duty cycle that provides a desired average output voltage over the course of the duty cycle for the drive signal.

At least one of the high-side and low-side voltages for the output driver may be generated from a suitable input voltage, e.g., a battery voltage, by a DC-DC converter. In some cases, the DC-DC converter may be a variable voltage converter operable to selectively vary the switching voltage in use.

It has been found that in certain architectures of multilevel output stages, nonlinearities may occur in signal paths powered from a multilevel power converter due to the discharge characteristics of flying capacitors integral to a multilevel power converter. The droop in flying capacitor voltages due to such discharge may present itself as a duty-cycle dependent output resistance, with such dependence following a different profile for each mode of the multilevel converter. The consequence of this mode-dependent output resistance variation may be a discontinuity in the output impedance at each node transition. Accordingly, systems and methods for correcting for such mode-dependent output resistance variation may be desired.

SUMMARY

In accordance with the teachings of the present disclosure, the disadvantages and problems associated with mode transitions in a multilevel power converter may be reduced or eliminated.

In accordance with embodiments of the present disclosure, a feedforward correction block for use in a multi-level output system may include circuitry configured to determine an occurrence of a mode transition between operating modes of the multi-level output system, capture a loop filter output of a signal path of the multi-level output system occurring before and after the occurrence of the mode transition, and based on the transition and a change in the loop filter output responsive to the transition, determine a transition-specific compensation function to apply to a feedforward input signal of the signal path that is combined with the loop filter output.

In accordance with these and other embodiments of the present disclosure, a method for feedforward correction of a multi-level output system may include determining an occurrence of a mode transition between operating modes of the multi-level output system, capturing a loop filter output of a signal path of the multi-level output system occurring before and after the occurrence of the mode transition, and based on the transition and a change in the loop filter output responsive to the transition, determining a transition-specific compensation function to apply to a feedforward input signal of the signal path that is combined with the loop filter output.

In accordance with these and other embodiments of the present disclosure, a multi-level output system may include an output driver subsystem for outputting an output driving signal response to an input signal, wherein the multi-level output system is configured to operate in a selected operating mode selected from a plurality of operating modes based on the input signal, and a supply voltage for the output driver subsystem is selected based on the selected operating mode. The multi-level output system may also include a feedforward correction block comprising circuitry configured to determine an occurrence of a mode transition between operating modes of the multi-level output system, capture a loop filter output of a signal path of the multi-level output system occurring before and after the occurrence of the mode transition, and based on the transition and a change in the loop filter output responsive to the transition, determine a transition-specific compensation function to apply to a feedforward input signal of the signal path that is combined with the loop filter output.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
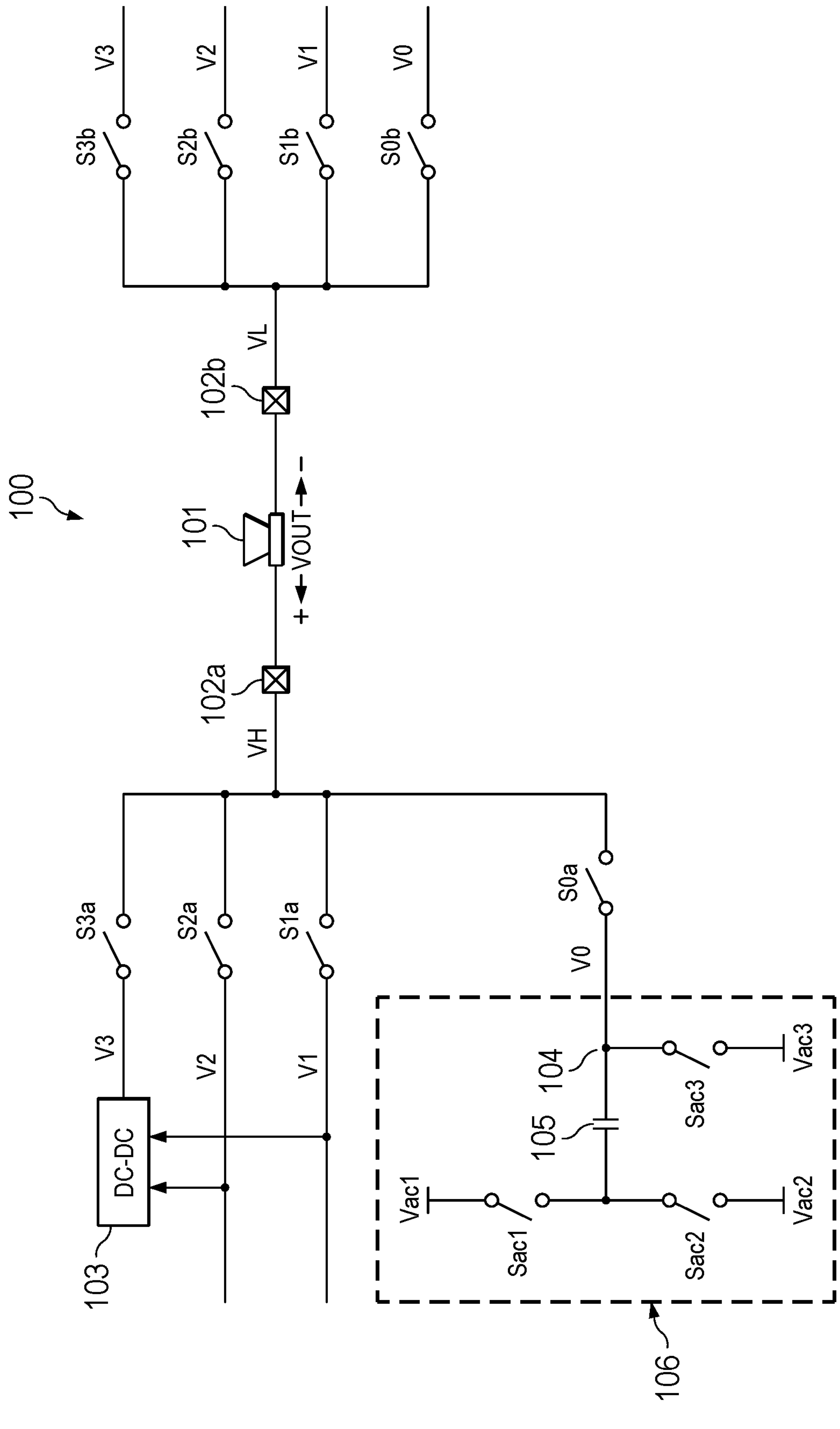
FIG. 1 illustrates an example driving circuit for driving a load, wherein such driving circuit comprises a multilevel power converter, in accordance with embodiments of the present disclosure.

FIG. 1 illustrates an example driving circuit 100 for driving a load transducer 101 with an output voltage VOUT, in accordance with embodiments of the present disclosure. In some embodiments, driving circuit 100 may be implemented in accordance with U.S. patent application Ser. No. 17/678,527 filed Feb. 23, 2022, and incorporated by reference herein in its entirety.

Load transducer 101 may comprise an audio output transducer (e.g., loudspeaker), a haptic transducer, piezo-electric transducer, ceramic transducer, or any other suitable transducer.

As shown in FIG. 1, an output node 102*a* may be selectively coupled, via switching paths S1*a*, S2*a* and S3*a*, to any of three supply voltages V1, V2 or V3, at respective switching voltage nodes. Also as shown in FIG. 1, supply voltages V1 and V2 may be system voltages, which as used herein may refer to any generally continuous voltage maintained or generated by other components, and which is received by/available to the driver apparatus. For example, V1 and V2 could be ground and a received input supply voltage +VDD (or −VDD). The input supply voltage V2 may be derived from a system battery voltage, possibly with some voltage regulation and/or boosting applied by some other upstream circuitry and/or the input supply voltage could be provided from a system power supply, such as a switched mode-power supply. Switching path S1*a* may selectively couple output node 102*a* to received voltage V1 and switching path S2*a* may selectively couple output node 102*a* to received voltage V2.

As depicted in FIG. 1, a third, different, supply voltage V3 may be generated by a DC-DC converter 103, which may comprise a charge pump, an inductive converter or the like. In the embodiments represented by FIG. 1, DC-DC converter 103 may generate supply voltage V3 using the received system voltages V1 and V2. Switching path S3*a* may selectively couple output node 102*a* to supply voltage V3.

Each of the voltages V1, V2 and V3 may, in use, be maintained in a substantially continuous manner, that is, the relevant voltage may be maintained at a substantially constant level and the voltage at the relevant switching node may not substantially vary over the course of a full switching cycle of the driving circuit 100. In embodiments in which DC-DC converter 103 comprises a switched mode converter, such as a charge pump, DC-DC converter 103 may be operable to maintain the supply voltage throughout a full switching cycle of DC-DC converter 103. The voltages at the relevant switching node may thus be substantially independent of the input signal for driving circuit 100. It will, of course, be understood that the output voltage of a DC-DC converter such as a charge pump or inductive boost converter or the like may exhibit some voltage ripple due to the operation of the DC-DC converter, but the extent of such ripple is relatively small and a switched DC-DC converter such as a charge pump generally comprises an energy storage element such as a reservoir capacitor to maintain the output voltage throughout the whole of the switching cycle of the DC-DC converter.

In some embodiments, supply voltage V3 generated by DC-DC converter 103 may be generated in a substantially continuous manner when DC-DC converter 103 is active. This continuous voltage generation does not, however, mean that DC-DC converter 103 need be continuously active. If, for instance, supply voltage V3 generated by DC-DC converter 103 is only used for switching for relatively high magnitude output signals, in some cases DC-DC converter 103 may be controlled to be inactive if the signal magnitude is relatively low. However, when active, DC-DC converter 103 may operate to maintain its output supply voltage V3 in a continuous manner.

The supply voltages V1, V2 and V3 provide a first set of switching voltages and, in use, output node 102*a* may be switched between a selected pair of these switching voltages with a controlled duty cycle so as to provide the desired output signal. Output node 102*a* may be switched between these voltages by controlling the relevant switching paths S1*a*, S2*a* and S3*a* to couple output node 102*a* to the relevant supply voltages with a controlled duty-cycle. Such operation may be seen as direct-coupled switching, or a direct charge transfer mode of operation, as the output node 102*a* may be switched to be directly coupled to the relevant DC voltage supplies. The DC supply voltages may, for example, be derived from a battery, an inductive switched mode power supply, or a switched capacitor power supply and maintain the voltage in substantially continuous fashion, i.e., are generally able to supply current for an extended period of time, for example greater than the period of the output drive signal at the lowest needed frequency. The terms "direct-coupled" and "DC-coupled" shall be used herein to refer to such switching of the output node between such supply voltages.

In addition, output node 102*a* may be selectively coupled, via switching path S0*a*, to an output voltage node 104 of a flying capacitor driver 106. Output voltage node 104 may be coupled to a first terminal of a capacitor 105. The second terminal of capacitor 105 may be configured to be selectively switched between two different voltages Vac1 and Vac2 by switches Sac1 and Sac2. The first terminal of capacitor 105 may also be selectively coupled to a voltage Vac3, by switch Sac3. In use, the capacitor 105 may be cyclically charged and then coupled to provide voltage boosting (positive or negative) of one of voltages Vac1 and Vac2 to generate a boosted voltage at the switching voltage node and thus the capacitor 105 may be used as a flying capacitor. Voltages Vac1, Vac2 and Vac3 may, in some implementations, be selected such that the boosted voltage generated at the output voltage node 104 is different to any of voltages V1, V2 and V3. Voltage Vac1 may be different to the voltage Vac2 and, if the switches Sac1 and Sac3 are operated in phase with one another, then Vac1 and Vac3 may also be different from one another so that capacitor 105 may be charged by the voltage difference between voltage Vac1 and Vac3 when both switches Sac1 and Sac3 are closed. Voltages Vac2 and Vac3 may be the same as one another or different. It is understood that Vac1 may be more or less positive than Vac2 and/or Vac3. Conveniently at least one, and possibly all, of the voltages Vac1, Vac2 and Vac3 may be provided by one of supply voltages V1, V2 and V3, but any other system voltage may be used to provide one or more of these voltages.

For example, consider that supply voltage V2 is used for voltage Vac1 and that supply voltage V1 is used for both voltages Vac2 and Vac3, with the supply voltage V2 being more positive than V1. In use, in one state with the second terminal of capacitor 105 coupled to Vac1=V2 and the first terminal of capacitor 105 coupled to Vac3=V1, the capacitor may be charged to a voltage +(V2−V1) with the positive plate at the second terminal. In this state, output voltage node 104 may be at the voltage Vac3=V1. In a second state, the second terminal of capacitor 105 may instead be coupled to Vac2=V1 and the first terminal of capacitor 105 may be decoupled from Vac3. In this state, capacitor 105 may provide negative boosting of supply voltage Vac2, which thus generates a negatively boosted voltage V0 at the output voltage node, where V0=−(V2−V1). In this example, output voltage node 104 can thus be switched between the voltages V1 and V0, with the duty cycle being controlled by the switching of switches Sac1, Sac2 and Sac3. Capacitor 105, together with the switches Sac1, Sac2 and Sac3 may thus be seen as a flying capacitor based auxiliary driver or charge pump 106 for driving the output node.

Capacitor 105 may thus be selectively switched to provide selective boosting to provide a voltage V0, which may be different to the voltages V1, V2 and V3. Such operation may be seen as an indirect-coupled switching, or an indirect charge transfer mode of operation, as, in operation when the voltage V0 is generated, output voltage node 104 may be indirectly coupled to supply voltage Vac2 via capacitor 105. Voltage V0 may not be maintained continuously throughout the whole switching cycle of driving circuit 100. As used herein, the terms "indirect-coupled" or "indirect switching" will be used to refer to such operation and the term "AC-coupled" will also be used to refer to such operation.

Driving circuit 100 may thus be operable in a direct-coupled mode of operation and may switch the output between selected ones of the supply voltages V1, V2, V3 and also be operable in an indirect-coupled mode of operation, to generate at least one additional voltage V0. Driving circuit 100 may thus be a mixed direct-coupled and indirect-coupled switching driver. Energy may be transferred to load transducer 101 via a mix of "DC-coupled" and "AC-coupled" paths according to the required output signal.

DC supply voltages V1, V2 and V3 and the at least one additional boosted voltage V0 may be chosen to provide a desired output voltage range for the single-ended drive signal at output node 102*a*. The difference between the highest voltage level (i.e., most positive/least negative) and the lowest voltage level (i.e., least positive/most negative) from the voltages V1, V2, V3 and V0 may be selected to provide a desired output range for the output drive signal. Other voltages are selected to provide intermediate voltage levels. In use, the driving circuit 100 may be controlled so as to only switch the output node between adjacent voltage levels.

For instance, if V3>V2>V1>V0 (in terms of being more positive), then the output node may be switched between the voltages V2 and V3 with a controlled duty cycle to provide an (average) output voltage at the output node 102*a* in the range between V2 and V3. To provide a lower (average) output voltage, the output node may be switched between V1 and V2 to provide an (average) output voltage in the range between V1 and V2 or switched between V0 and V1 to provide an average voltage in this range. Driving circuit 100 may also comprise switching paths S1*b*, S2*b* and S3*b* for selectively coupling an output node 102*b* coupled to the opposite terminal of load transducer 101 to the supply voltages V1, V2 and V3 respectively. Driving circuit 100 may also have a switching path S0*b* for selectively coupling output node 102*b* to a switching voltage node for indirect-coupled switching. In some cases, switching path S0*b* may couple output node 102*b* to the output voltage node 104, but in some cases, there may be an additional charge pump, for providing indirectly-coupled switching for output node 102*b*. Each of the output nodes 202*a* and 202*b* may be selectively switched between appropriate switching voltages to provide a desired differential voltage across load transducer 101.

Figure 2:
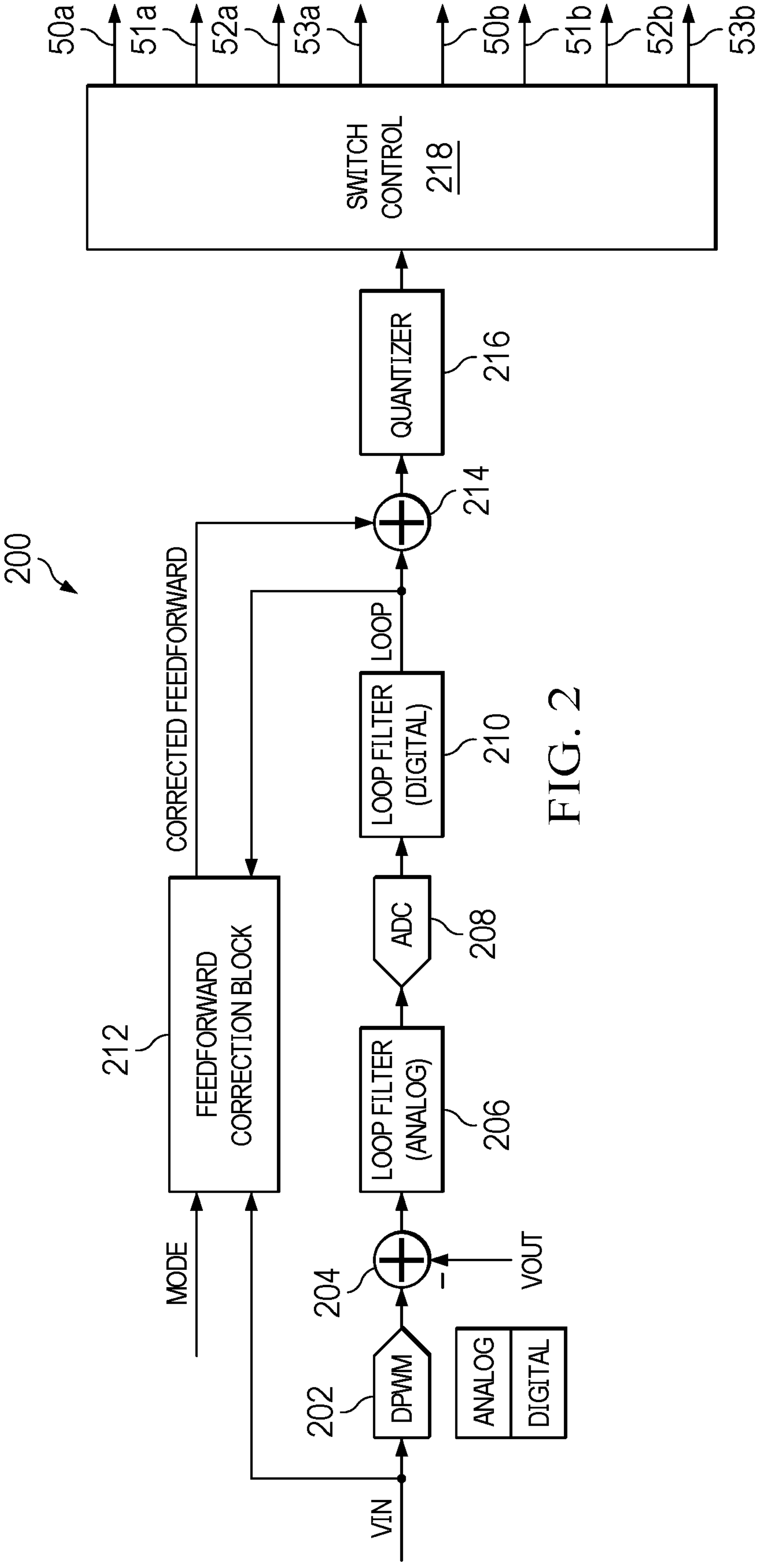
FIG. 2 illustrates an example functional block diagram of a signal path, in accordance with embodiments of the present disclosure.

FIG. 2 illustrates an example functional block diagram of a signal path 200, in accordance with embodiments of the present disclosure. As shown in FIG. 2, a digital PWM block 202 may receive input signal VIN and generate a PWM equivalent of input signal VIN. A combiner 204 may subtract output voltage VOUT feedback from class-D output stage 102 from the output of digital PWM block 202 to generate an error signal. An analog loop filter 206 may low-pass filter the error signal and an analog-to-digital converter (ADC) 208 may convert the filtered error signal to a digital equivalent signal. A digital loop filter 210 may further low-pass filter the digital signal to generate loop output signal LOOP.

A feedforward correction block 212 may receive input signal VIN, loop output signal LOOP, and an indication MODE of an operating mode of driving circuit 100 (e.g., the mode indicative of the switch states of switches S0*a*, S1*a*, S2*a*, S3*a*, S0*b*, S1*b*, S2*b*, and S3*b*), and, based thereon, generate a corrected feedforward signal as described in greater detail below. A combiner 214 may combine the corrected feedforward signal with the output of digital loop filter 210. A quantizer 216 (e.g., which may be implemented using a digital PWM block) may quantize the resulting signal to generate PWM signal VPWM and communicate PWM signal VPWM to switch control circuitry 218. Based on PWM signal VPWM, switch control circuitry may generate control switch signals S0*a*, S1*a*, S2*a*, S3*a*, S0*b*, S1*b*, S2*b*, and S3*b* in order to generate output voltage VOUT as a function of input signal VIN.

Figure 3:
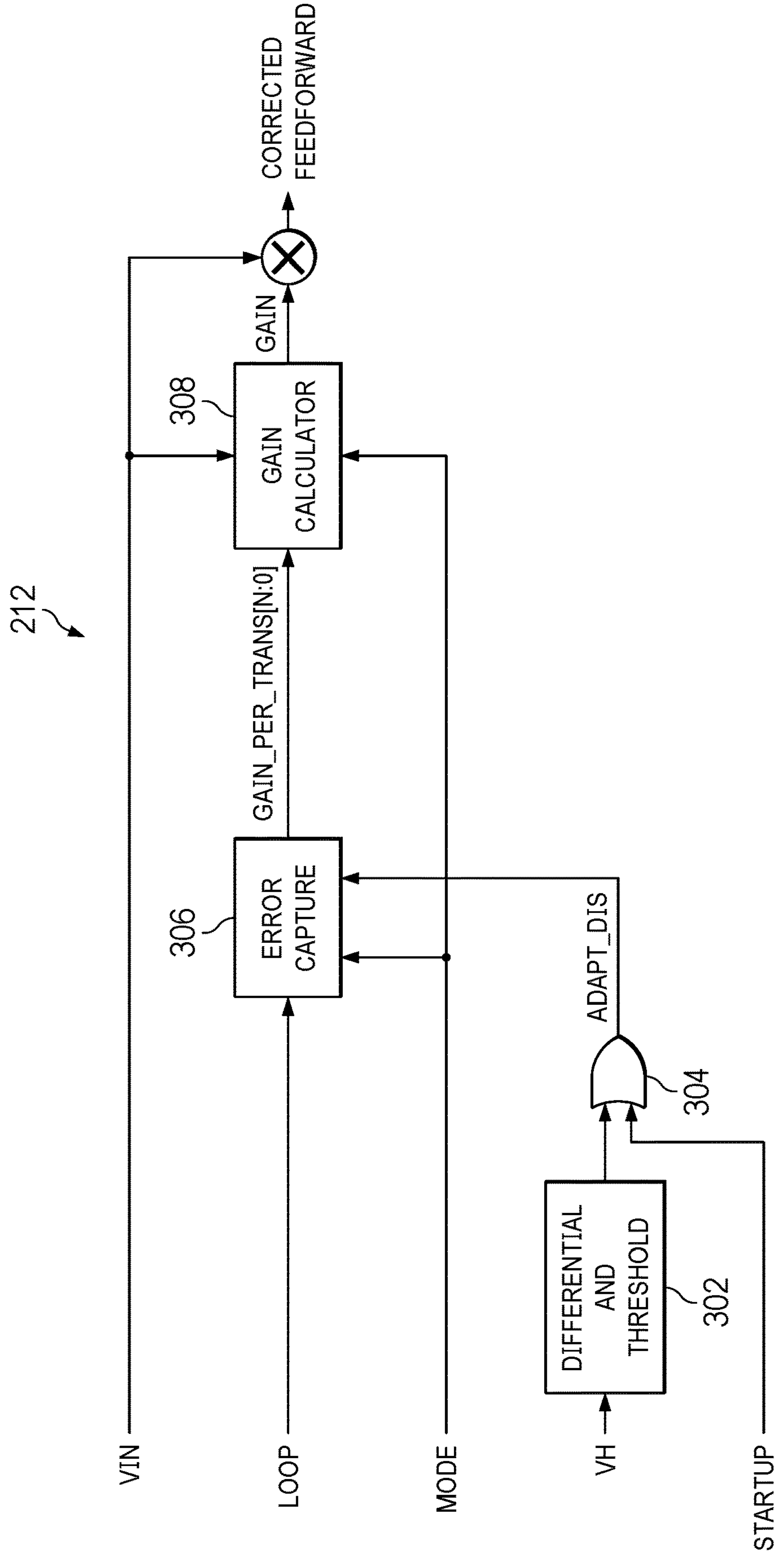
FIG. 3 illustrates an example functional block diagram of a feedforward correction block, in accordance with embodiments of the present disclosure.

FIG. 3 illustrates an example functional block diagram of feedforward correction block 212, in accordance with embodiments of the present disclosure. As shown in FIG. 3, a differential and threshold detect block 302 may receive a high-side switching voltage VH (or a digitized representation thereof) representative of a voltage present at output node 102*a* and detect whether such high-side switching voltage VH has crossed a threshold voltage level for disabling adaptation and/or whether a change (e.g., between successive samples or over a period of time) of high-side switching voltage VH has exceeded a threshold change in voltage level for disabling adaptation. A logical OR gate 304 may perform a logical OR of the output of differential and threshold detect block 302 and a signal indicating whether a system comprising switching driving circuit 100 is in startup, and will set a variable ADAPT_DIS to "true" if high-side switching voltage VH has crossed a threshold voltage level for disabling adaptation, the change of high-side switching voltage VH has exceeded a threshold change in voltage level for disabling adaptation, and/or the system comprising switching driving circuit 100 is in startup. Otherwise, logical OR gate 304 may set variable ADAPT_DIS to "false." If variable ADAPT_DIS is set to true, error capture block 306 will be disabled.

If error capture block 306 is enabled, it may determine if a transition between modes of charge pump 103 has occurred, and if such a transition has occurred, may capture a change in the error signal in signal path 200, as indicated by loop output signal LOOP right before and right after occurrence of the transition. Error capture block 306 may further determine a mode-transition-specific gain relationship (e.g., a linear gain as a function of input signal VIN) for such transition based on the change of the error signal, and may communicate such gain relationship to gain calculator 308 as indicated by GAIN_PER_TRANS[N:0]. Such gain relationship may, when applied to feed-forward input signal VIN, generate a corrected feedforward signal to minimize the change in the error signal, as indicated by a change in loop output signal LOOP responsive to a change in mode. Accordingly, error capture block 306 may calculate a respective gain relationship for each of N possible transitions between modes of driving circuit 100, including transitions from each mode to each other mode, and vice versa. Further, error capture 306 may be configured to continuously adapt its calculations for respective gain relationships for each of N possible transitions between modes of charge pump 103 in order to further minimize the change in the error signal, as indicated by loop output signal LOOP, responsive to a transition of charge pump 103.

Gain calculator 308 may receive from error capture block 306 the various respective gain relationships for each of N possible transitions between modes of charge pump 103 and based on such gains, input signal VIN, and a current transition state (if any) of charge pump 103 as indicated by a change in mode indication MODE, apply a gain function as a function of input signal VIN (e.g., gain=f(VIN)) to calculate a gain value GAIN to be applied by a combiner 310 to input signal VIN in order to generate a corrected feed-forward signal. In some embodiments, the gain function may be a piecewise-linear gain function based on the various gain relationships.

Although the foregoing contemplates applying a transition-specific gain function to a feedforward input signal of the signal path that is combined with the loop filter output based on a transition and a change in the loop filter output responsive to the transition, it is understood that other compensation may be applied in addition to or in lieu of a gain. For example, in some embodiments, an additive compensation function (e.g., as opposed to a multiplicative gain function) may be used.

Embodiments of the present disclosure may be implemented as an integrated circuit. Embodiments may be implemented in a host device, especially a portable and/or battery powered host device such as a mobile computing device, for example a laptop, notebook or tablet computer, or a mobile communication device such as a mobile telephone, for example a smartphone. The device could be a wearable device such as a smartwatch. The host device could be a game console, a remote-control device, a home automation controller or a domestic appliance, a toy, a machine such as a robot, an audio player, or a video player. It will be understood that embodiments may be implemented as part of a system provided in a home appliance or in a vehicle or interactive display. There is further provided a host device incorporating the above-described embodiments.

The skilled person will recognize that some aspects of the above-described apparatus and methods, for instance aspects of controlling the switching control signals to implement the different modes, may be embodied as processor control code, for example on a non-volatile carrier medium such as a disk, CD- or DVD-ROM, programmed memory such as read only memory (Firmware), or on a data carrier such as an optical or electrical signal carrier. For some applications, embodiments may be implemented on a DSP (Digital Signal Processor), ASIC (Application Specific Integrated Circuit) or FPGA (Field Programmable Gate Array). Thus, the code may comprise conventional program code or microcode or, for example, code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL (Very high-speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A feedforward correction block for use in a multi-level output system having an output driver subsystem for outputting an output driving signal response to an input signal, comprising:

circuitry configured to:

determine an occurrence of a mode transition between operating modes of the multi-level output system;

capture a loop filter output of a signal path of the multi-level output system occurring before and after the occurrence of the mode transition; and based on the transition and a change in the loop filter output responsive to the transition, determine a transition-specific compensation function to apply to a feedforward input signal of the signal path that is combined with the loop filter output;

wherein:

the multi-level output system is configured to operate in a selected operating mode selected from a plurality of operating modes based on the input signal; and a supply voltage for the output driver subsystem is selected based on the selected operating mode.

2. The feedforward correction block of claim 1, wherein the transition-specific compensation function defines a gain value as a function of the feedforward input signal.

3. The feedforward correction block of claim 2, wherein the transition-specific compensation function defines a gain value as a piecewise linear function of the feedforward input signal.

4. A method for feedforward correction in a multi-level output system having an output driver subsystem for outputting an output driving signal response to an input signal, comprising:

determining an occurrence of a mode transition between operating modes of the multi-level output system;

capturing a loop filter output of a signal path of the multi-level output system occurring before and after the occurrence of the mode transition; and based on the transition and a change in the loop filter output responsive to the transition, determining a transition-specific compensation function to apply to a feedforward input signal of the signal path that is combined with the loop filter output;

wherein:

the multi-level output system is configured to operate in a selected operating mode selected from a plurality of operating modes based on the input signal; and a supply voltage for the output driver subsystem is selected based on the selected operating mode.

5. The method of claim 4, wherein the transition-specific compensation function defines a gain value as a function of the feedforward input signal.

6. The method of claim 5, wherein the transition-specific compensation function defines a gain value as a piecewise linear function of the feedforward input signal.

7. A multi-level output system, comprising:

an output driver subsystem for outputting an output driving signal response to an input signal, wherein:

the multi-level output system is configured to operate in a selected operating mode selected from a plurality of operating modes based on the input signal; and a supply voltage for the output driver subsystem is selected based on the selected operating mode; and a feedforward correction block comprising circuitry configured to:

determine an occurrence of a mode transition between operating modes of the multi-level output system;

capture a loop filter output of a signal path of the multi-level output system occurring before and after the occurrence of the mode transition; and based on the transition and a change in the loop filter output responsive to the transition, determine a transition-specific compensation function to apply to a feedforward input signal of the signal path that is combined with the loop filter output.

8. The multi-level output system of claim 7, wherein the transition-specific compensation function defines a gain value as a function of the feedforward input signal.

9. The multi-level output system of claim 8, wherein the transition-specific compensation function defines a gain value as a piecewise linear function of the feedforward input signal.

* * * * *